US006366400B1

United States Patent
Ohzawa

(10) Patent No.: US 6,366,400 B1
(45) Date of Patent: Apr. 2, 2002

(54) PROJECTION IMAGE DISPLAY OPTICAL SYSTEM

(75) Inventor: Soh Ohzawa, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/503,347

(22) Filed: Feb. 14, 2000

(30) Foreign Application Priority Data

Feb. 23, 1999 (JP) .......................................... 11-044284

(51) Int. Cl.⁷ ...................... G03B 13/06; G02B 17/00; G02B 27/14
(52) U.S. Cl. ...................... 359/434; 359/364; 359/629; 359/631
(58) Field of Search ................................ 359/364–367, 359/850–858, 618, 625, 627–640, 726–732; 353/64, 20, 94, 98, 99

(56) References Cited

U.S. PATENT DOCUMENTS

| 3,443,858 A | | 5/1969 | Russa | 359/631 |
| 5,517,366 A | | 5/1996 | Togino | 359/850 |
| 5,654,828 A | * | 8/1997 | Togino et al. | 359/631 |
| 5,710,668 A | * | 1/1998 | Gohman et al. | 359/631 |
| 5,715,023 A | * | 2/1998 | Hoppe | 359/630 |
| 5,734,505 A | * | 3/1998 | Togino et al. | 359/631 |

FOREIGN PATENT DOCUMENTS

JP 7-120679 5/1995

* cited by examiner

*Primary Examiner*—Thong Nguyen
(74) *Attorney, Agent, or Firm*—Burns, Doane, Swecker & Mathis, LLP

(57) ABSTRACT

An optical system provided with a relay optical system forming an intermediate image of a primary image and an eyepiece optical system projecting an enlarged virtual image of the intermediate image on a pupil. The eyepiece optical system includes, sequentially from the pupil side, a first reflection-transmission surface and a second reflection-transmission surface that is concave on the pupil side, wherein an image surface of the intermediate image has a convex shape relative to the pupil. The optical system satisfies the predetermined condition is satisfied.

20 Claims, 6 Drawing Sheets

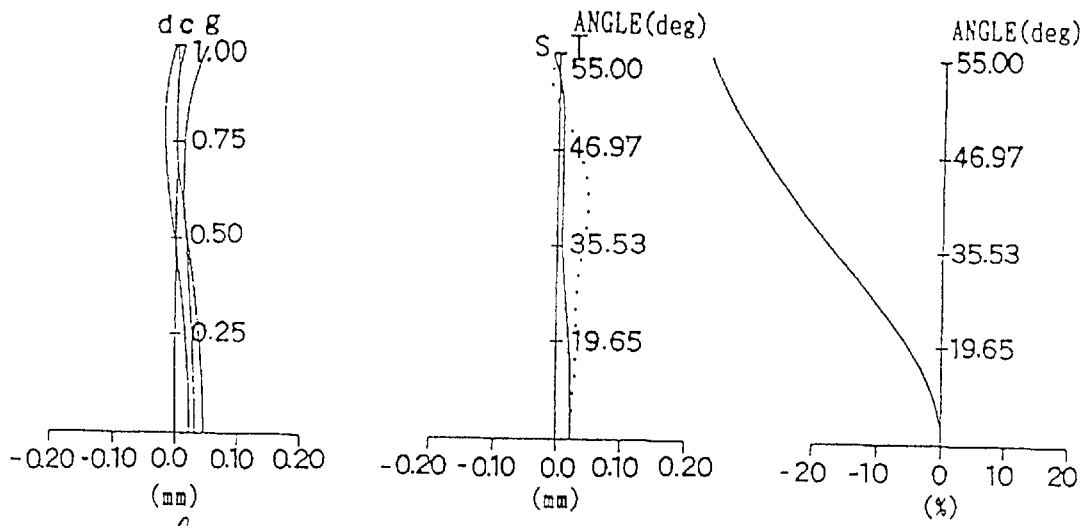
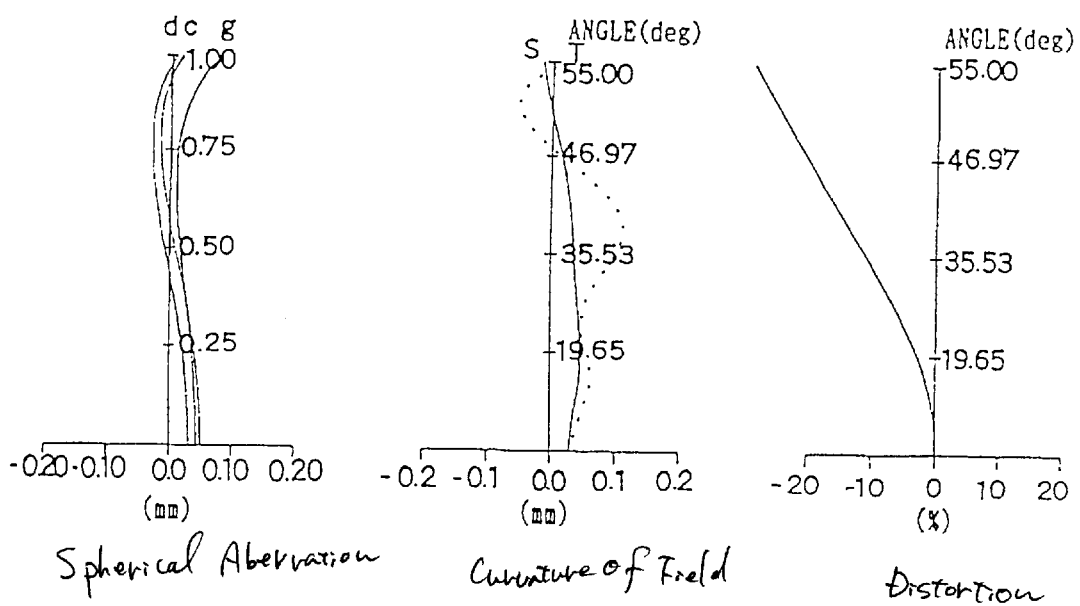

PROJECTION IMAGE DISPLAY OPTICAL SYSTEM

CROSS-REFERENCE TO RELATED APPLICATIONS

This application is based on patent application No. 11-44284 filed in Japan, the content of which is hereby incorporated by reference.

BACKGROUND OF THE INVENTION

1. Field of the invention

The present invention relates to a projection image display optical system, e.g., a projection image display optical system suitable for use in projection image display devices such as a head-mounted display (HMD) which projects a two-dimensional image displayed on a liquid crystal display (LCD) onto the pupil of an observer who views an enlarged virtual image.

2. Description of the Related Art

Heretofore, there have been a number of proposed eyepiece optical systems having a so-called pancake structure wherein a flat two-dimensional projection image is enlarged and viewed using a reflection-transmission surface. For examples, U.S. Pat. No. 3,443,858 discloses an eyepiece optical system provided with a flat reflection-transmission surface and a concave transmission surface on the pupil side, and Japanese Laid-Open Patent No. 7-120679 discloses an eyepiece optical system provided with two severely concave reflection-transmission surfaces on the pupil side.

In the assembly of the reflection-transmission surface proposed in the specification of U.S. Pat. No. 3,443,858, however, it is difficult to achieve a wide angle of field due to restrictions of spherical aberration and image surface curvature. One proposed example forms a curved aerial image via a projection relay system to correct image surface curvature, but the construction of the projection relay system is not specifically shown by way of examples and according to the described layout it is difficult to achieve a wide field of view exceeding 60°. On the other hand, although a wide field of view can be achieved according to the assembly of the reflection-transmission surface disclosed in Japanese Laid-Open Patent No. 7-120679, the device is expensive because a large two-dimensional projection image display element must be used. Furthermore, a wave plate and cholesteric liquid crystal surface are used to form the reflection-transmission surface so as to eliminate direct light using polarization, but forming the two reflection-transmission surfaces is difficult because both are curved surfaces.

SUMMARY OF THE INVENTION

An object of the present invention is to provide an improved projection image display optical system.

Another object of the present invention is to provide a projection image display optical system using a compact display element.

Still another object of the present invention is to provide a projection image display optical system having a wide angle of field capable of high resolution projection image display.

These objects are attained by a projection image display optical system provided with a relay optical system, for forming an intermediate image of a two-dimensional projection image, and an eyepiece optical system for projecting an enlarged virtual image of the intermediate image on the pupil of an observer, wherein the image surface of the intermediate image has a convex shape relative to the pupil, and the eyepiece optical system includes sequentially from the pupil side a first reflection-transmission surface, and a second reflection-transmission surface that is concave on the pupil side, and wherein the equation 0.4<dR/fs<1.8 is satisfied, where dR represents the axial distance between the first reflection-transmission surface and the second reflection-transmission surface, and fs represents the focal length of the eyepiece optical system.

BRIEF DESCRIPTION OF THE DRAWINGS

These and other objects and features of this invention will become clear form the following description taken in conjunction with the preferred embodiments with reference to the accompanying drawings, in which:

FIG. 5. is an aberration diagram for the first numerical example;

FIG. 6. is an aberration diagram for the second numerical example;

DESCRIPTION OF THE PREFERRED EMBODIMENT

Figure 1:
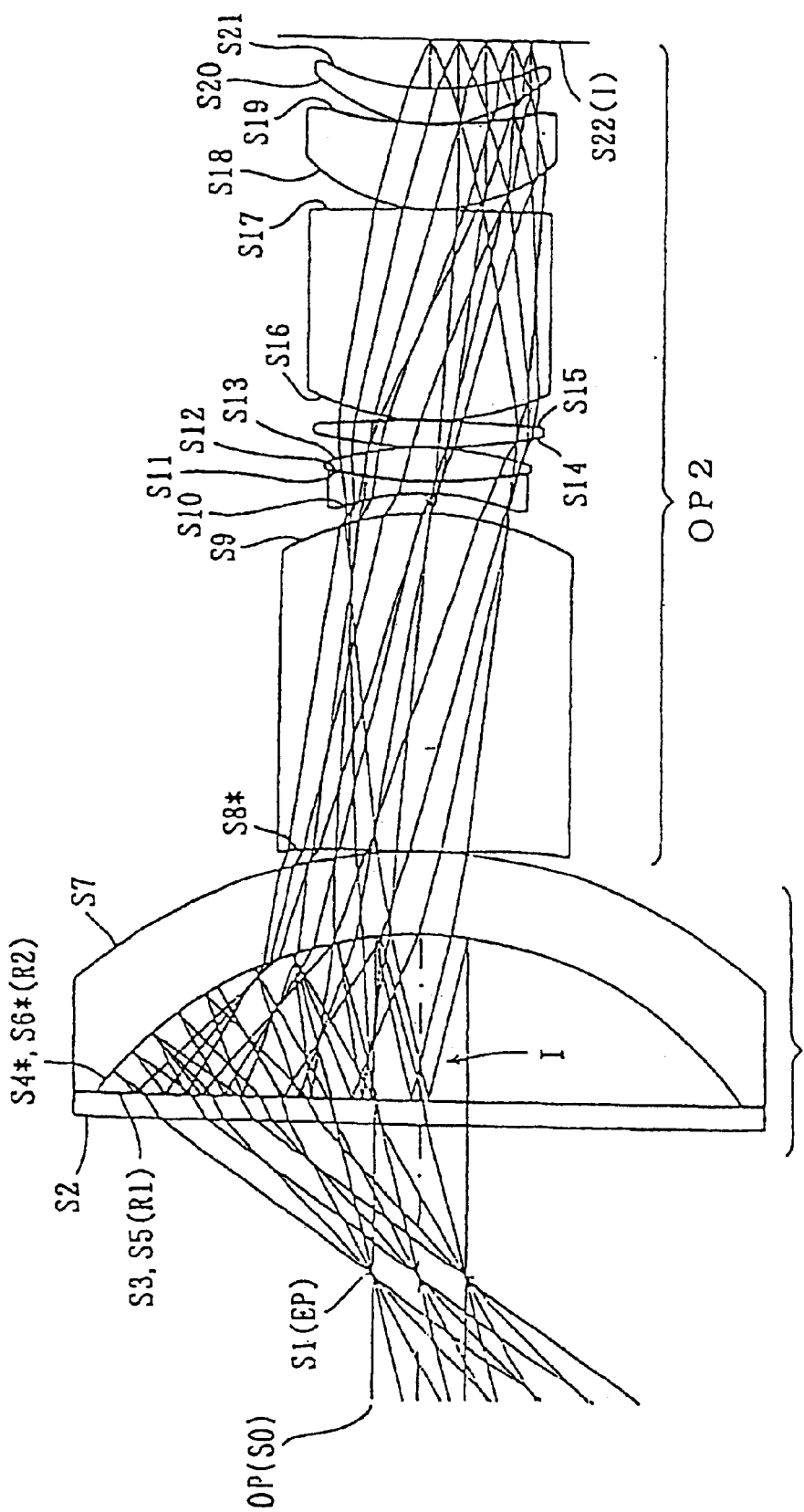
FIG. 1. shows the optical construction of a first embodiment (first numerical example)
Figure 2:
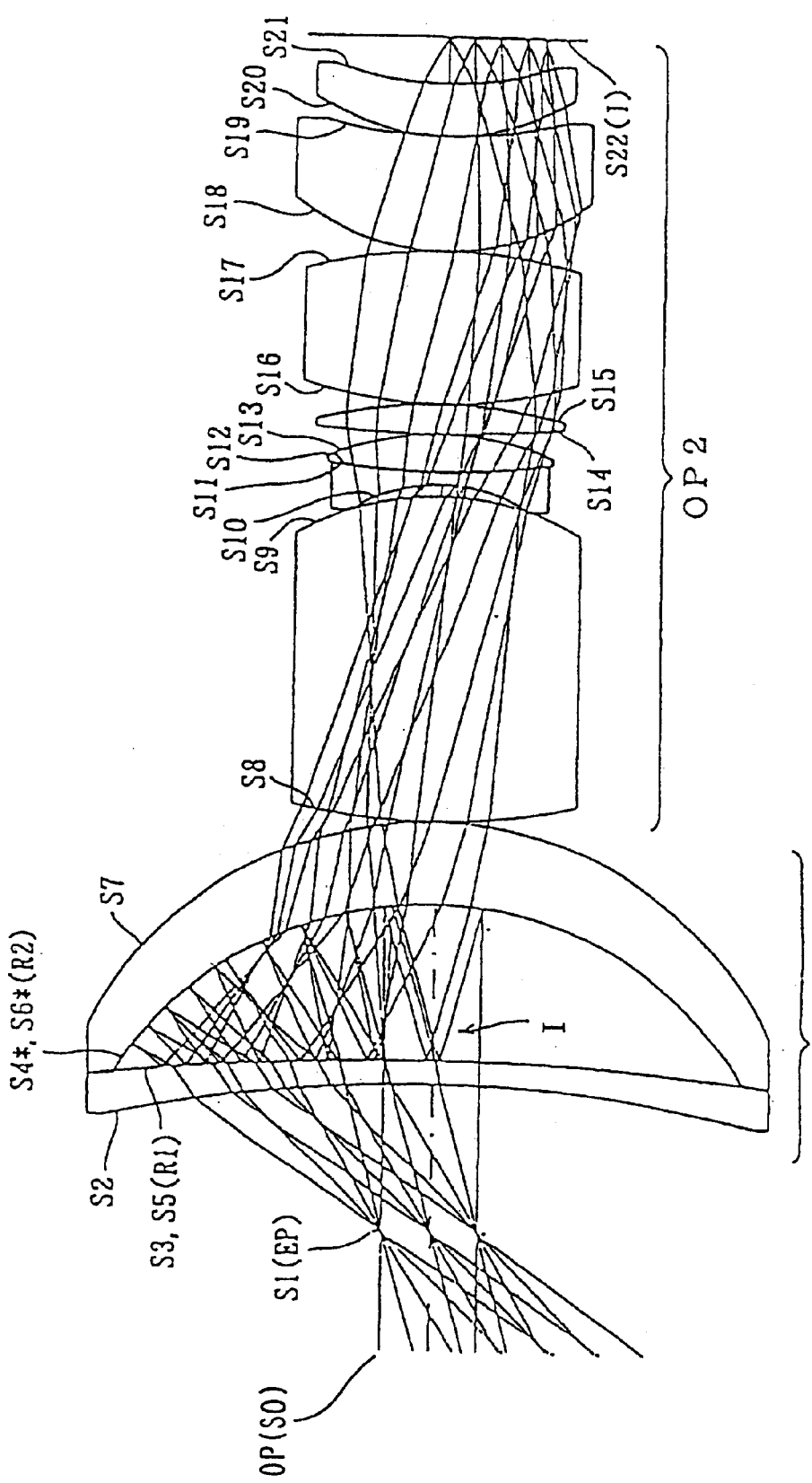
FIG. 2. shows the optical construction of a second embodiment (second numerical example)
Figure 3:
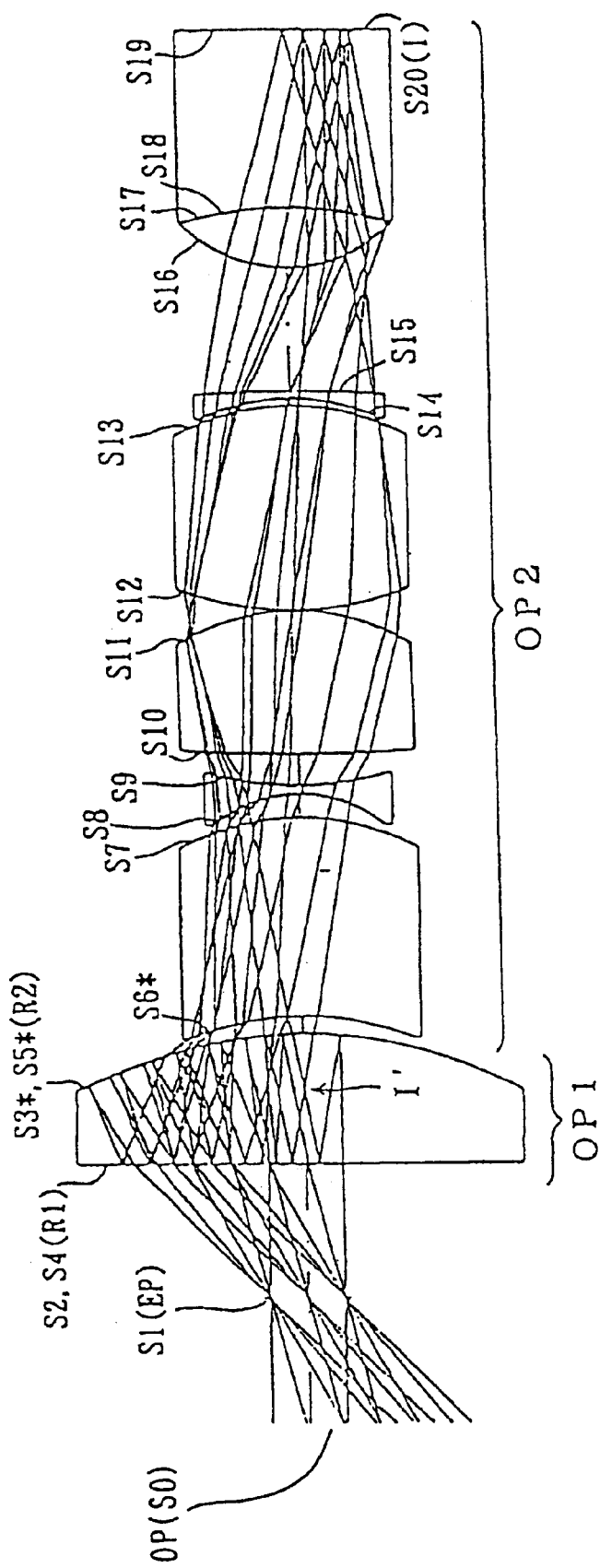
FIG. 3. shows the optical construction of a third embodiment (third numerical example)
Figure 4:
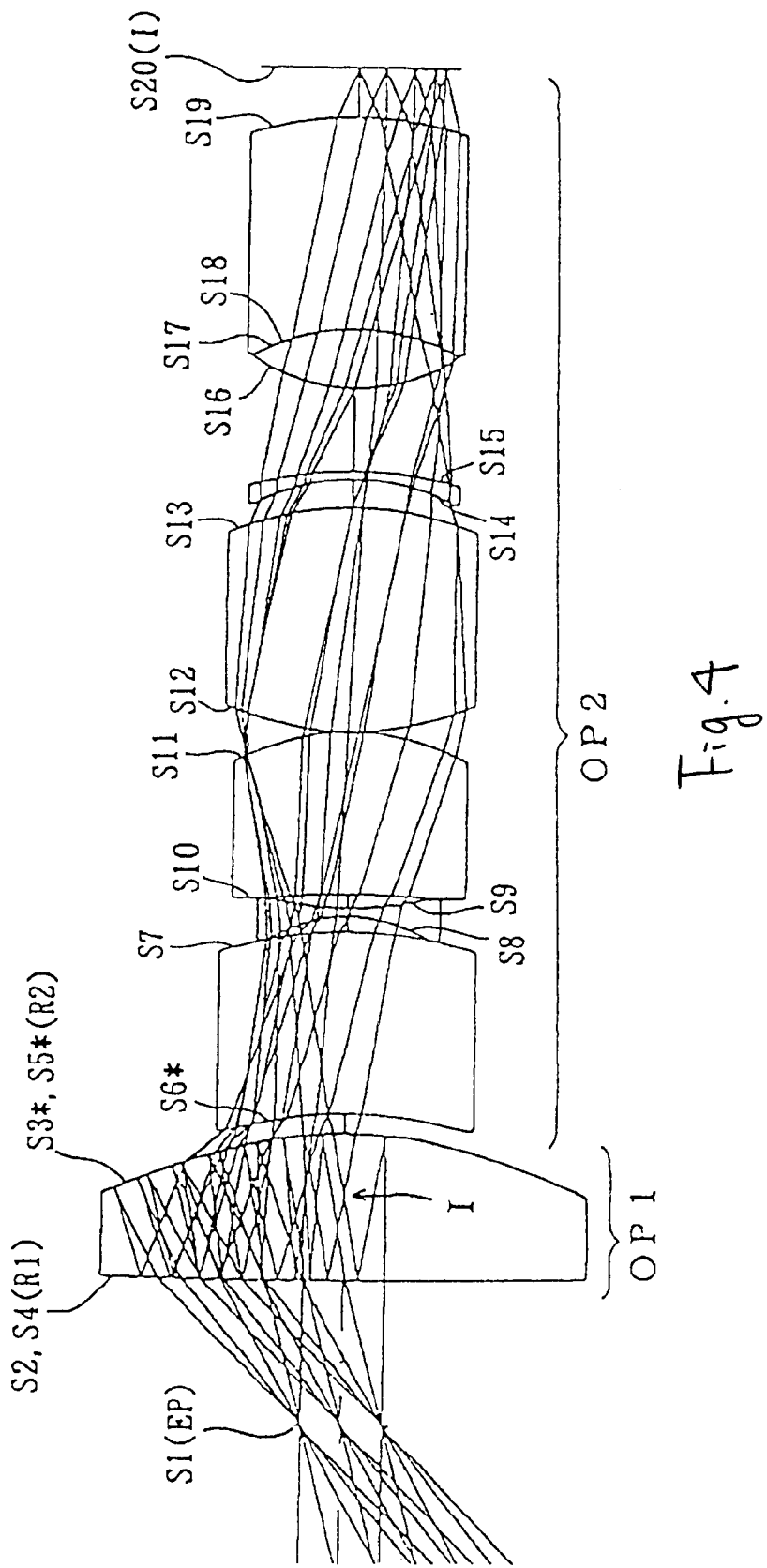
FIG. 4. shows the optical construction of a fourth embodiment (fourth numerical example)

The projection image display optical system of the present invention is described hereinafter with reference to the accompanying drawings. FIGS. 1~4 are structural diagrams of the optical systems of the first through fourth embodiments. In these drawings, reference symbol (I) refers to the primary image surface, and this image surface (I) corresponds to the display surface of a display unit (e.g., a two-dimensional display element such as an LCD and the like) for displaying a two-dimensional projection image. The surface Si (i=1, 2, 3, . . . ) is the No. surface counting from the pupil (EP) side in a system including a pupil (EP), and a surface Si having an appended asterisk (*) symbol denotes an aspherical surface.

All embodiments are provided with a relay optical system (OP2) for forming an intermediate image (I') of a two-dimensional primary projection image (i.e., image surface (I)), and an eyepiece optical system (OP1) for projecting an enlarged virtual image of the intermediate image (I') on the pupil (EP) of an observer. Within the eyepiece optical system (OP1), the intermediate image surface (I') forms a convex shape relative to the pupil (EP). The eyepiece (OP1) includes sequentially from the pupil (EP) side a first reflection-transmission surface (R1), and a second reflection-transmission surface (R2) that is concave on the pupil (EP) side.

Since the magnification of the relay optical system (OP2) becomes adjustable by providing a relay optical system (OP2) for forming an intermediate image (I') as described above, it is possible to project an enlarged projection image using a small two-dimensional display element. Accordingly, the two-dimensional display element is inexpensive and the field of view can be widened even though the display unit is compact. Furthermore, the image surface curvature in the pancake part of the eyepiece optical system (OP1) can be corrected by forming a convex shape intermediate image surface (I') relative to the pupil (EP) of the observer. Since one of the reflection-transmission surfaces (R1, R2) does not need to be curved, the reflection-transmission surfaces (R1, R2) may be formed by a wave plate and cholesteric liquid crystal surface, so as to achieve a wide angle of field using an eyepiece system (OP1) having a simple construction.

In a projection image display optical system provided with a relay optical system (OP2) and an eyepiece optical system (OP1), wherein the intermediate image surface (I') has a convex shape relative to the pupil (EP), and the eyepiece optical system includes sequentially from the pupil side a first reflection-transmission surface, and a second reflection-transmission surface that is concave on the pupil side as in each of the exemplary embodiments, it is desirable that the condition (1) below is satisfied.

$$0.4 < dR/fs < 1.8 \tag{1}$$

Where dR represents the axial distance between the first reflection-transmission surface (R1) and the second reflection-transmission surface (R2), and fs represents the focal length of the eyepiece optical system (OP1).

Condition (1) stipulates the condition for achieving a wide angle of field while ensuring suitable eye relief and compactness of the eyepiece optical system (OP1). When the lower limit of condition (1) is exceeded, the spacing between the two reflection-transmission surfaces (R1, R2) becomes too narrow, and the diameter of the eyepiece optical system (OP1) becomes too large in order to obtain a wide angle of field. When the upper limit of condition (1) is exceeded, the optical path between the two reflection-transmission surfaces (R1, R2) becomes too long, and it becomes difficult for an observer to view the two-dimensional projection image because the pupil (EP) position approaches the first reflection-transmission surface (R1).

It is desirable that condition (1') below is satisfied. When the lower limit of conditional equation (1') is exceeded, the fold-back effect of the two reflection-transmission surfaces (R1, R2) is reduced, and the overall length of the projection image display optical system is increased. When the upper limit of condition (1') is exceeded, the luminous flux width increases due to the separation of the intermediate image surface (I') from the relay optical system (OP2). Accordingly, the diameter of the relay optical system (OP2) becomes too large, such that it becomes difficult to achieve a light weight projection image display optical system.

$$0.6 < dR/fs < 1.4 \tag{1'}$$

It is further desirable that condition (2) is satisfied.

$$0.8 \leq fs/fr < 1.5 \tag{2}$$

Where fs represents the focal length of the eyepiece optical system (OP1), and fr represents the focal length of the relay optical system (OP2).

Conditional equation (2) stipulates the desirable focal length ratio between the relay optical system (OP2) and the eyepiece optical system (OP1). When the optical power of the relay optical system (OP2) is too strong such that the upper limit of conditional equation (2) is exceeded, it becomes difficult to correct the aberration generated by the relay optical system (OP2). When the optical power of the eyepiece optical system (OP1) is too weak such that the lower limit of conditional equation (2) is exceeded, the diameter of the eyepiece optical system (OP1) becomes too large in order to achieve a wide angle of field, such that the projection image display optical system cannot be compact. When the optical power of the eyepiece optical system (OP1) is too strong such that the lower limit of conditional equation (2) is exceeded, it becomes difficult to obtain effective eye relief.

The first and second embodiments have three lenses comprising a positive-negative-positive lens arrangement of surfaces S8~S13 within the relay optical system (OP2), and the third and fourth embodiments have three lenses comprising a positive-negative-positive lens arrangement of surfaces S12~S17 within the relay optical system (OP2). It is desirable that a positive-negative-positive lens arrangement is used within the relay optical system (OP2) as in these embodiments. This lens structure provide easy adjustment of convex image surface curvature relative to the pupil (EP) via the relay optical system (OP2), and provides excellent image surface characteristics at a wide angle of field.

It is desirable that the first reflection-transmission surface (R1) uses a construction which provides polarized light selective reflection-transmission functionality in the center area, and provides half-mirror characteristics in the peripheral area. That is, it is desirable to use a construction providing a polarized light selective reflection-transmission layer for markedly changing characteristics according to the angle of the incident light, wherein this layer is provided in a region of small incident ray angle in the center of the field of view. The function of the polarized light selective reflection-transmission layer is not particularly necessary in the region of large incident ray angle in the periphery of the field of view because the direct light misses the pupil (EP). Accordingly, the peripheral area of the first reflection-transmission surface (R1) may be constructed as a half-mirror which minimally changes angular characteristics. Since such a construction produces an excellent projection image, a special manufacturing method is not required to change the characteristics of the polarized light selective reflection-transmission layer in the center area and the peripheral area, thereby reducing manufacturing cost. The previously mentioned polarized light selective reflection-transmission layer functionality may be realized by using cholesteric liquid crystal and ¼ wavelength wave plate.

It is desirable that the second reflection-transmission surface (R2) uses a construction which provides a reflection-transmission characteristics in the center area and simple reflection characteristics in the peripheral area. Since only a simple reflective surface function is required in the peripheral area of the second reflection-transmission surface (R2), when such a construction is used the reflectivity is improved in the peripheral area of the second reflection-transmission surface (R2), and peripheral light reduction is compensated for the entire projection image display optical system, such that the entire field of view is brightened.

It is desirable that the first reflection-transmission surface (R1) satisfies condition (3) below. When the lower limit of condition (3) is exceeded, the convex shape of the first reflection-transmission surface (R1) becomes too strong on the pupil (EP) side, so as to make it difficult to correct image surface curvature. When the upper limit of condition (3) is exceeded, the concave surface shape of the first reflection-transmission surface (R1) becomes too strong, so as to make formation of the polarized light selective reflection-transmission layer difficult.

$$-0.05 \leq fL/CRs < 0.1 \quad (3)$$

Where CRs represents the radius of curvature of the first reflection-transmission surface (R1), and fL represents the focal length of the entire projection image display optical system.

It is desirable that the region circumscribed by the first reflection-transmission surface (R1) and the second reflection-transmission surface (R2) is formed of a single member using a medium which has a reflective index exceeding 1, as in the third and fourth embodiments. According to this construction, manufacturing costs are reduced because the eyepiece optical system (OP1) can be formed by a single member. Furthermore, it is desirable that at least one of the reflection-transmission surfaces (R1, R2) is formed of cholesteric liquid crystal. According to this construction, the polarized light selective reflection-transmission layer is easily formed.

The construction of the projection image display optical system of the present invention is described below by way of specific construction data examples. Numerical examples 1~4 respectively correspond to the previously described first through fourth embodiments, and the optical structure diagrams (FIGS. 1~4) representing each embodiment correspond to the optical structures of the corresponding numerical examples. In the construction data of the numerical examples, Si (i=0, 1, 2, 3, . . . ) represents the No. i surface counting from the object point (OP, SO) side in the system including the pupil (EP) and the image surface (I), and ri (i=0, 1, 2, 3, . . . ) represents the radius of curvature of the surface Si. Furthermore, di (i=0, 1, 2, 3, . . . ) represents the axial distance (mm) of the No. i surface counting from the object point (OP, SO) side in a system including the pupil (EP) and the image surface (1), Ni (i=1, 2, 3, . . . ) and vi (i=1, 2, 3, . . . ) respectively represent the refractive index (Nd) and Abbe number (vd) relative to the d-line of the No. i optical element counting from the object point (OP, SO) side.

Surface Si having an appended asterisk symbol (*) represents a surface constructed as an aspherical surface, and the surface shape of an aspherical is defined by equation (AS) below. Aspherical surface data, pupil (EP) diameter, and field angle are shown with other data in Table 1 which provides condition-correspondent values and related data for each numerical example:

$$Z(H)=(C_O \cdot H^2)/\{1+\sqrt{(1-\epsilon \cdot C_O^2 \cdot H^2)}\}+(A4 \cdot H^4+A6 \cdot H^6+A8 \cdot H^8+A10 \cdot H^{10}) \quad (AS)$$

Where Z(H) represents the amount of displacement (surface apex reference) in the optical axis direction at a position of height H, H represents the height from the optical axis (height in a direction perpendicular to the optical axis), $C_O$ represents paraxial curvature, $\epsilon$ represents the secondary curved surface parameter, and Ai represents the i degree aspherical surface coefficient (1=4, 6, 8, 10).

Figure 7:
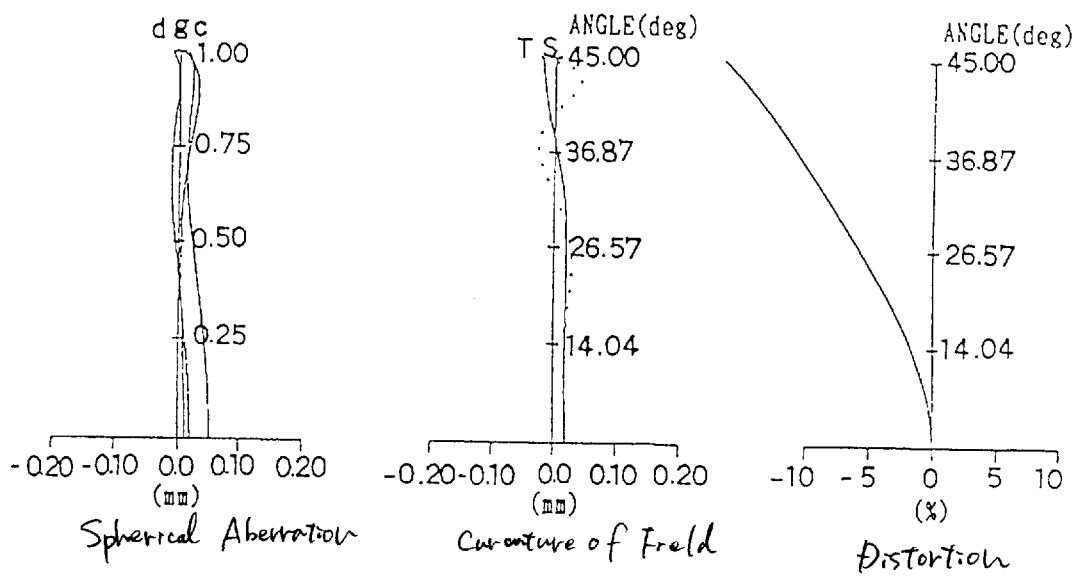
FIG. 7. is an aberration diagram for the third numerical example.
Figure 8:
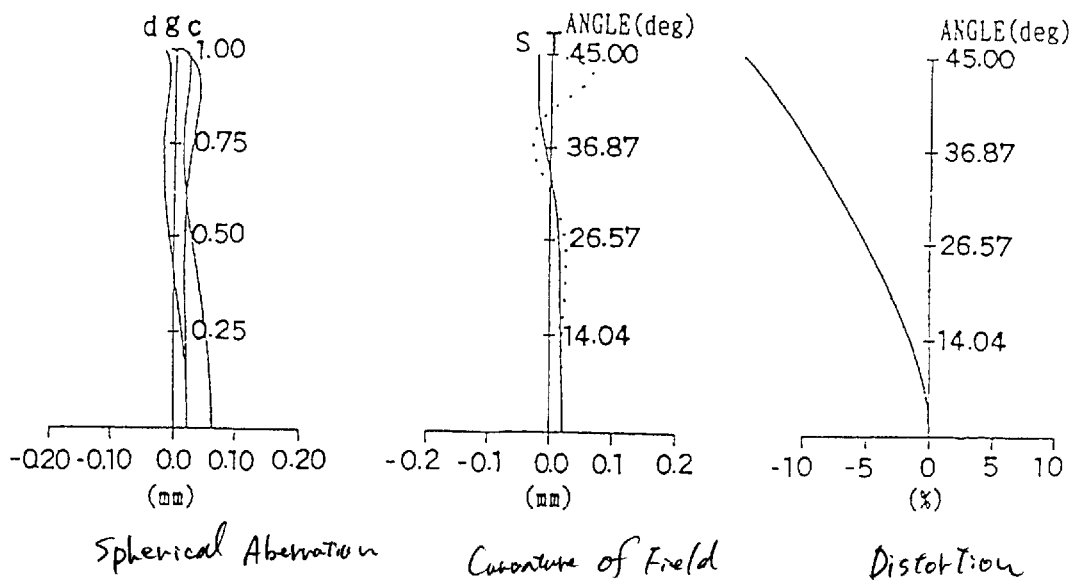
FIG. 8. is an aberration diagram for the fourth numerical example.

FIGS. 5 through 8 are aberration diagrams corresponding to the numerical examples 1~4, and show sequentially from the left spherical aberration, astigmatism (image surface curvature), and distortion. In the spherical aberration diagrams, the vertical axis shows the entrance height to the pupil (EP) standardized at a maximum height (i.e., a corresponding height cutting the entrance pupil plane), and the horizontal axis shows the amount of dislocation (mm) from the paraxial image forming position in the optical axis direction. Line (c) represents the amount of spherical aberration relative to the c-line (wavelength: $\lambda c=656.3$ nm), line (d) represents the amount of spherical aberration relative to the d-line (wavelength: $\lambda d=587.6$ nm), and line (g) represents the amount of spherical aberration relative to the g-line (wavelength: $\lambda g=35.8$ nm). In the astigmatism diagrams, the vertical axis shows the half field angle (°), and the horizontal axis represents the amount of dislocation (mm) from the paraxial image forming position in the optical axis direction. The solid line (S) represents astigmatism on the sagittal plane, and point (T) represents astigmatism on the tangential plane. In the distortion diagrams, the vertical axis represents the half field angle (°), and the horizontal axis represents the amount of distortion (%). Although the image surface (I) is properly the object plane, from an optical design perspective, optical characteristics are evaluated at the image surface (I).

TABLE 1

<Numerical Example 1>
Pupil diameter = φ 10.0 (mm)
Angle of Field = 110(°)

| Surface | Radius of Curvature | Axial Distance | Refractive Index | Abbe Number |
|---|---|---|---|---|
| S0(OP) | r0 = ∞ | | | |
| | | d0 = ∞ | | |
| S1(EP) | r1 = ∞ | | | |
| | | d1 = 16.000 | | |
| S2 | r2 = ∞ | | | |
| | | d2 = 2.500 | N1 = 1.5160 | v1 = 64.20 |
| S3(R1) | r3 = ∞: (Transmission) | | | |
| | | d3 = 17.500 | | |
| S4(R2) | *r4 = −43.028: (Reflection) | | | |
| | | d4 = −17.500 | | |
| S5(R1) | r5 = ∞: (Reflection) | | | |
| | | d5 = 17.500 | | |
| S6(R2) | *r6 = −43.028: (Transmission) | | | |
| | | d6 = 9.000 | N2 = 1.4914 | μ2 = 59.93 |
| S7 | r7 = −53.926 | | | |
| | | d7 = 0.100 | | |
| S8 | *r8 = 186.453 | | | |
| | | d8 = 36.000 | N3 = 1.8487 | v3 = 31.57 |
| S9 | r9 = −30.637 | | | |
| | | d9 = 2.235 | | |
| S10 | r10 = −26.440 | | | |
| | | d10 = 1.200 | N4 = 1.7985 | v4 = 22.60 |
| S11 | r11 = 50.518 | | | |
| | | d11 = 0.263 | | |
| S12 | r12 = 69.066 | | | |
| | | d12 = 3.296 | N5 = 1.7545 | v5 = 51.57 |
| S13 | r13 = −37.064 | | | |
| | | d13 = 0.100 | | |
| S14 | r14 = 59.972 | | | |
| | | d14 = 2.679 | N6 = 1.7545 | v6 = 51.57 |
| S15 | r15 = −148.940 | | | |
| | | d15 = 0.100 | | |
| S16 | r16 = 29.130 | | | |
| | | d16 = 22.161 | N7 = 1.4875 | v7 = 70.44 |
| S17 | r17 = −524.117 | | | |
| | | d17 = 0.100 | | |
| S18 | r18 = 19.530 | | | |
| | | d18 = 9.081 | N8 = 1.4875 | v8 = 70.44 |
| S19 | r19 = 47.511 | | | |
| | | d19 = 0.100 | | |
| S20 | r20 = 18.326 | | | |
| | | d20 = 3.586 | N9 = 1.6657 | v9 = 55.17 |
| S21 | r21 = 28.709 | | | |
| | | d21 = 5.000 | | |
| S22(I) | r22 = ∞ | | | |

TABLE 1-continued

Aspherical Data of 4th Surface (S4), 6th surface (S6)

$\epsilon = 1.000000$
$A4 = 0.254740 \times 10^{-7}$
$A6 = -0.254026 \times 10^{-9}$
$A8 = 0.133218 \times 10^{-12}$
$A10 = -0.607125 \times 10^{-16}$ Aspherical Data of 8th surface (S8)

$\epsilon = 1.000000$
$A4 = -0.172592 \times 10^{-4}$
$A6 = -0.264225 \times 10^{-7}$
$A8 = 0.161764 \times 10^{-9}$
$A10 = -0.311702 \times 10^{-12}$

TABLE 2

<Numerical Example 2>
Pupil diameter = φ 10.0 (mm)
Angle of Field = 110(°)

| Surface | Radius of Curvature | Axial Distance | Refractive Index | Abbe Number |
|---|---|---|---|---|
| S0(OP) | r0 = ∞ | | | |
| | | d0 = ∞ | | |
| S1(EP) | r1 = ∞ | | | |
| | | d1 = 16.000 | | |
| S2 | r2 = −159.812 | | | |
| | | d2 = 2.500 | N1 = 1.5160 | ν1 = 64.20 |
| S3(R1) | r3 = −310.915: (Transmission) | | | |
| | | d3 = 17.500 | | |
| S4(R2) | *r4 = −39.233: (Reflection) | | | |
| | | d4 = −17.500 | | |
| S5(R1) | r5 = −310.915: (Reflection) | | | |
| | | d5 = 17.500 | | |
| S6(R2) | *r6 = −39.233: (Transmission) | | | |
| | | d6 = 9.000 | N2 = 1.4914 | ν2 = 59.93 |
| S7 | r7 = −40.898 | | | |
| | | d7 = 0.100 | | |
| S8 | r8 = 65.853 | | | |
| | | d8 = 35.685 | N3 = 1.8484 | ν3 = 30.33 |
| S9 | r9 = −29.992 | | | |
| | | d9 = 1.358 | | |
| S10 | r10 = −17.145 | | | |
| | | d10 = 1.200 | N4 = 1.7985 | ν4 = 22.60 |
| S11 | r11 = 69.284 | | | |
| | | d11 = 0.206 | | |
| S12 | r12 = 91.614 | | | |
| | | d12 = 3.904 | N5 = 1.7545 | ν5 = 51.57 |
| S13 | r13 = −30.686 | | | |
| | | d13 = 0.100 | | |
| S14 | r14 = 133.926 | | | |
| | | d14 = 3.062 | N6 = 1.7545 | ν6 = 51.57 |
| S15 | r15 = −57.212 | | | |
| | | d15 = 0.100 | | |
| S16 | r16 = 44.381 | | | |
| | | d16 = 16.780 | N7 = 1.4875 | ν7 = 70.44 |
| S17 | r17 = −56.598 | | | |
| | | d17 = 0.100 | | |
| S18 | r18 = 24.701 | | | |
| | | d18 = 12.705 | N8 = 1.7125 | ν8 = 53.10 |
| S19 | r19 = 49.723 | | | |
| | | d19 = 0.100 | | |
| S20 | r20 = 25.458 | | | |
| | | d20 = 5.600 | N9 = 1.7570 | ν9 = 51.14 |
| S21 | r21 = 35.671 | | | |
| | | d21 = 5.000 | | |
| S22(I) | r22 = ∞ | | | |

Aspherical Data of 4th surface (S4), 6th surface (S6)

$\epsilon = 1.000000$
$A4 = 0.505814 \times 10^{-6}$
$A6 = -0.108683 \times 10^{-8}$

TABLE 2-continued $A8 = 0.174454 \times 10^{-11}$
$A10 = -0.102650 \times 10^{-14}$

TABLE 3

<Numerical Example 3>
Pupil diameter = φ 10.0 (mm)
Angle of Field = 90(°)

| Surface | Radius of Curvature | Axial Distance | Refractive Index | Abbe Number |
|---|---|---|---|---|
| S0(OP) | r0 = ∞ | | | |
| | | d0 = ∞ | | |
| S1(EP) | r1 = ∞ | | | |
| | | d1 = 17.500 | | |
| S2(R1) | r2 = ∞: (Transmission) | | | |
| | | d2 = 17.500 | N1 = 1.4930 | ν1 = 58.34 |
| S3(R2) | *r3 = −54.643: (Reflection) | | | |
| | | d3 = −17.500 | N2 = 1.4930 | ν2 = 58.34 |
| S4(R1) | r4 = ∞: (Reflection) | | | |
| | | d4 = 17.500 | N3 = 1.4930 | ν3 = 58.34 |
| S5(R2) | *r5 = −54.643: (Transmission) | | | |
| | | d5 = 2.500 | | |
| S6* | r6 = −37.912 | | | |
| | | d6 = 26.439 | N4 = 1.7985 | ν4 = 22.60 |
| S7 | r7 = −34.068 | | | |
| | | d7 = 2.987 | | |
| S8 | r8 = −19.161 | | | |
| | | d8 = 1.100 | N5 = 1.6668 | ν5 = 28.62 |
| S9 | r9 = 45.313 | | | |
| | | d9 = 4.098 | | |
| S10 | r10 = 302.586 | | | |
| | | d10 = 18.620 | N6 = 1.8500 | ν6 = 40.04 |
| S11 | r11 = −30.597 | | | |
| | | d11 = 0.100 | | |
| S12 | r12 = 42.335 | | | |
| | | d12 = 26.447 | N7 = 1.7545 | ν7 = 51.57 |
| S13 | r13 = −33.823 | | | |
| | | d13 = 0.934 | | |
| S14 | r14 = −30.075 | | | |
| | | d14 = 1.000 | N8 = 1.7985 | ν8 = 22.60 |
| S15 | r15 = −204.302 | | | |
| | | d15 = 16.383 | | |
| S16 | r16 = 20.190 | | | |
| | | d16 = 7.965 | N9 = 1.7545 | ν9 = 51.57 |
| S17 | r17 = −50.025 | | | |
| | | d17 = 0.129 | | |
| S18 | r18 = −46.853 | | | |
| | | d18 = 23.698 | N10 = 1.8469 | ν10 = 24.58 |
| S19 | r19 = ∞ | | | |
| | | d19 = 0.100 | | |
| S20(I) | r20 = ∞ | | | |

Aspherical Data of 3rd surface (S3), 5th surface (S5)

$\epsilon = 000000$
$A4 = 0.106660 \times 10^{-5}$
$A6 = 0.631963 \times 10^{-9}$
$A8 = -0.118029 \times 10^{-11}$
$A10 = 0.963897 \times 10^{-15}$ Aspherical Data of 6th surface (S6)

$\epsilon = 1.000000$
$A4 = -0.119331 \times 10^{-4}$
$A6 = 0.613350 \times 10^{-7}$
$A8 = -0.602400 \times 10^{-10}$
$A10 = 0.134171 \times 10^{-12}$

TABLE 4

<Numerical Example 4>
Pupil diameter = φ 10.0 (mm)
Angle of Field = 90(°)

| Surface | Radius of Curvature | Axial Distance | Refractive Index | Abbe Number |
|---|---|---|---|---|
| S0(OP) | r0 = ∞ | | | |
| | | d0 = ∞ | | |
| S1(EP) | r1 = ∞ | | | |
| | | d1 = 17.500 | | |
| S2(R1) | r2 = 1312.556: (Transmission) | | | |
| | | d2 = 17.500 | N1 = 1.4930 | ν1 = 58.34 |
| S3(R2) | *r3 = −55.466: (Reflection) | | | |
| | | d3 = −17.500 | N2 = 1.4930 | ν2 = 58.34 |
| S4(R1) | r4 = 1312.556: (Reflection) | | | |
| | | d4 = 17.500 | N3 = 1.4930 | ν3 = 58.34 |
| S5(R2) | *r5 = −55.466: (Transmission) | | | |
| | | d5 = 2.500 | | |
| S6 | *r6 = −50.363 | | | |
| | | d6 = 23.171 | N4 = 1.7985 | ν4 = 22.60 |
| S7 | r7 = −46.639 | | | |
| | | d7 = 1.905 | | |
| S8 | r8 = −18.492 | | | |
| | | d8 = 1.000 | N5 = 1.6774 | ν5 = 27.91 |
| S9 | r9 = 47.231 | | | |
| | | d9 = 1.656 | | |
| S10 | r10 = −106.781 | | | |
| | | d10 = 19.968 | N6 = 1.8500 | ν6 = 40.04 |
| S11 | r11 = −30.100 | | | |
| | | d11 = 0.100 | | |
| S12 | r12 = 37.898 | | | |
| | | d12 = 28.000 | N7 = 1.7545 | ν7 = 51.57 |
| S13 | r13 = −39.152 | | | |
| | | d13 = 3.416 | | |
| S14 | r14 = −27.349 | | | |
| | | d14 = 1.000 | N8 = 1.7985 | ν8 = 22.60 |
| S15 | r15 = −48.314 | | | |
| | | d15 = 10.430 | | |
| S16 | r16 = 23.648 | | | |
| | | d16 = 7.112 | N9 = 1.6174 | ν9 = 57.85 |
| S17 | r17 = −27.552 | | | |
| | | d17 = 0.100 | | |
| S18 | r18 = −26.817 | | | |
| | | d18 = 26.142 | N10 = 1.8266 | ν10 = 23.31 |
| S19 | r19 = −43.707 | | | |
| | | d19 = 6.000 | | |
| S20(I) | r20 = ∞ | | | |

Aspherical Data of 3$^{rd}$ surface (S3), 5$^{th}$ surface (S5)

ε = 1.000000
A4 = 0.121787 × 10$^{-5}$
A6 = 0.593420 × 10$^{-9}$
A8 = −0.107595 × 10$^{-11}$
A10 = 0.100643 × 10$^{-14}$

Aspherical Data of 6$^{th}$ surface (S6)

ε = 1.000000
A4 = −0.117105 × 10$^{-4}$
A6 = 0.107602 × 10$^{-6}$
A8 = −0.351782 × 10$^{-9}$
A10 = 0.734469 × 10$^{-12}$

TABLE 5

| | dR/fs | fs/fr | fL/CRs | fs | fr | fL |
|---|---|---|---|---|---|---|
| Ex. 1 | 0.787 | 1.112 | 0.0 | 22.234 (S2–S7) | 20.002 (S8–S21) | −11.755 |
| Ex. 2 | 0.809 | 1.071 | 0.0338 | 21.625 (S2–S7) | 20.190 (S8–S21) | −10.493 |
| Ex. 3 | 0.913 | 1.242 | 0.0 | 19.169 (52–S5) | 15.434 (S6–S19) | −10.778 |
| Ex. 4 | 0.917 | 1.065 | −0.0095 | 19.094 (S2–S5) | 17.923 (S6–S19) | −12.441 |

The present invention as described above is capable of correcting image surface curvature in the eyepiece optical system and displaying a high resolution projection image by forming an intermediate image surface having a convex shape relative to the pupil of an observer, and providing a compact display element via a relay optical system. Moreover, a wide field angle is achieved while ensuring suitable eye relief and compactness of the eyepiece optical system by suitably setting the axial distance between the first and second reflection-transmission surfaces.

Although the present invention has been fully described by way of examples with reference to the accompanying drawings, it is to be understood that various changes and modification will be apparent to those skilled in the art. Therefore, unless otherwise such changes and modifications depart from the scope of the present invention, they should be construed as being included therein.

What is claimed is:

1. An optical system comprising:
    a relay optical system forming an intermediate image of a primary image; and
    an eyepiece optical system projecting an enlarged virtual image of the intermediate image on a pupil, the eyepiece optical system including, sequentially from the pupil side, a first reflection-transmission surface and a second reflection-transmission surface that is concave on the pupil side,
    wherein an image surface of the intermediate image has a convex shape relative to the pupil, and wherein the following condition is satisfied, $0.4 < dR/fs < 1.8$ where dR represents the axial distance between the first reflection-transmission surface and the second reflection-transmission surface, and fs represents the focal length of the eyepiece optical system.

2. An optical system as claimed in claim 1, wherein the following condition is fulfilled:

$0.6 < dR/f < 1.8$

3. An optical system as claimed in claim 1, wherein the following condition is fulfilled:

$0.4 < dR/fs < 1.4$

4. An optical system as claimed in claim 1, wherein the following condition is fulfilled:

$0.6 < dR/fs < 1.4$

5. An optical system as claimed in claim 1, wherein the following condition is fulfilled:

$0.8 \leq fs/fr < 1.5$ where fr represents the focal length of the relay optical system.

6. An optical system as claimed in claim 1, wherein the following condition is fulfilled:

$-0.05 \leq fL/CRs < 0.1$ where CRs represents the radius of curvature of the first reflection-transmission surface and fL represents the focal length of the entire projection image display optical system.

7. An optical system as claimed in claim 1, wherein the relay lens system includes three lenses comprising a positive-negative-positive lens arrangement.

8. An optical system as claimed in claim 1, wherein the first reflection-transmission surface in a center area has a polarized light selective characteristic.

9. An optical system as claimed in claim 1, wherein the first reflection-transmission surface in a peripheral area is a half-mirror.

10. An optical system as claimed in claim 1, wherein the second reflection-transmission surface in a center area has reflection-transmission characteristics.

11. An optical system as claimed in claim 1, wherein the second reflection-transmission surface in a peripheral area has simple reflection characteristics.

12. An optical system as claimed in claim 1, wherein a region circumscribed by the first reflection-transmission surface and the second reflection-transmission surface is formed of a medium having a reflective index exceeding 1.

13. An optical system as claimed in claim 1, wherein at least one of the reflection-transmission surfaces is a surface of formed of cholesteric liquid crystal panel.

14. A display optical apparatus comprising:
  a display panel displaying a primary image;
  a relay optical system forming an intermediate image of the primary image; and
  an eyepiece optical system projecting an enlarged virtual image of the intermediate image on a pupil of an observer, the eyepiece optical system including, sequentially from the pupil side, a first reflection-transmission surface and a second reflection-transmission surface that is concave on the pupil side, wherein an image surface of the intermediate image has a convey shape relative to the pupil, and wherein the following condition is satisfied, $$0.4 < dR/fs < 1.8$$

where dR represents the axial distance between the first reflection-transmission surface and the second reflection-transmission surface, and fs represents the focal length of the eyepiece optical system.

15. A display optical apparatus as claimed in claim 14, wherein the relay lens system includes three lenses comprising a positive-negative-positive lens arrangement.

16. A display optical apparatus as claimed in claim 14, wherein the first reflection-transmission surface in a center area has a polarized light selective characteristic.

17. A display optical apparatus as claimed in claim 14, wherein the first reflection-transmission surface in a peripheral area is a half-mirror.

18. A display optical apparatus as claimed in claim 14, wherein the second reflection-transmission surface in a center area has reflection-transmission characteristics.

19. A display optical apparatus as claimed in claim 14, where in the second reflection-transmission surface in a peripheral area has simple reflection characteristics.

20. A display optical apparatus as claimed in claim 14, wherein a region circumscribed by the first reflection-transmission surface and the second reflection-transmission surface is formed of a medium having a reflective index exceeding 1.

* * * * *